US008078404B2

(12) United States Patent
Sjølie et al.

(10) Patent No.: US 8,078,404 B2
(45) Date of Patent: Dec. 13, 2011

(54) TRACING INJECTED FLUIDS

(75) Inventors: Jan Sjølie, Blommenholm (NO); Dag Ø. Dvergsten, Olso (NO)

(73) Assignee: GeoContrast AS, Oslo (NO)

( * ) Notice: Subject to any disclaimer, the term of this patent is extended or adjusted under 35 U.S.C. 154(b) by 0 days.

(21) Appl. No.: 10/966,144

(22) Filed: Oct. 15, 2004

(65) Prior Publication Data

US 2006/0076956 A1     Apr. 13, 2006

(30) Foreign Application Priority Data

Oct. 13, 2004   (NO) .................................. 20044358

(51) Int. Cl.
*G01V 9/00* (2006.01)

(52) U.S. Cl. ........................................................ 702/12

(58) Field of Classification Search .......... 702/9, 11–14, 702/16, 24, 25, 60, 57, 100, 133, 30, 38; 166/248, 250.5, 250.01, 250.12, 272.5, 304, 166/250, 12; 324/338, 339, 345
See application file for complete search history.

(56) References Cited

U.S. PATENT DOCUMENTS

| | | | | | |
|---|---|---|---|---|---|
| 3,931,856 | A | * | 1/1976 | Barnes ........................... | 166/245 |
| 4,068,717 | A | * | 1/1978 | Needham .................... | 166/272.5 |
| 4,641,099 | A | | 2/1987 | Lee et al. | |
| 4,681,164 | A | * | 7/1987 | Stacks ........................... | 166/304 |
| 4,734,649 | A | * | 3/1988 | Barnaby ....................... | 324/376 |
| 5,246,860 | A | * | 9/1993 | Hutchins et al. ................ | 436/27 |
| 5,335,542 | A | * | 8/1994 | Ramakrishnan et al. .. | 73/152.08 |
| 5,510,394 | A | * | 4/1996 | Hodgdon ........................ | 521/27 |
| 5,825,188 | A | | 10/1998 | Montgomery et al. | |
| 6,061,634 | A | * | 5/2000 | Belani et al. ..................... | 702/12 |
| 6,597,177 | B1 | * | 7/2003 | Amini ........................... | 324/339 |
| 6,840,316 | B2 | * | 1/2005 | Stegemeier et al. ..... | 166/250.12 |
| RE39,844 | E | * | 9/2007 | Srnka ........................... | 324/354 |
| 2002/0195247 | A1 | * | 12/2002 | Ciglenec et al. ......... | 166/250.11 |
| 2004/0069487 | A1 | | 4/2004 | Cook et al. | |
| 2005/0252286 | A1 | * | 11/2005 | Ibrahim et al. ............. | 73/152.55 |
| 2006/0015258 | A1 | * | 1/2006 | Dubourg et al. ................ | 702/11 |

FOREIGN PATENT DOCUMENTS

WO        03/023452        3/2003

OTHER PUBLICATIONS

Loke, "Electrical Imaging Surveys for Environmental and Engineering Studies: A Practical Guide to 2-D and 3-D Surveys," (Oct. 2000).
Aaltonen, "Ground Monitoring Using Resistivity Measurements in Glaciated Terrains," Dissertation, Department of Civil and Environmental Engineering, Divison of Land and Water Resources, Royal Institute of Technology (2001).
Huang et al., "Mapping of Resistivity, Susceptibility, and Permittivity of the Earth Using a Helicopter-Borne Electromagnetic System," Geophysics, vol. 66, No. 1, pp. 148-157 (Jan.-Feb. 2001).
Leighton et al., "Techniques for Mapping and Diagnosing EOR Processes," Journal of Petroleum Technology, vol. 39, No. 2, pp. 129-136 (Feb. 1987).
Mansure et al., "Steam-Zone Electrical Characteristics for Geodiagnostic Evaluation of Steamflood Performance," SPE Formation Evaluation, vol. 5, No. 3, pp. 241-247 (Sep. 1990).
Mansure et al., "Field Examples of Electrical Resistivity Changes During Steamflooding," SPE Formation Evaluation, vol. 8, No. 1, pp. 57-64 (Mar. 1993).

* cited by examiner

*Primary Examiner* — Mohamed Charioui
(74) *Attorney, Agent, or Firm* — Volpe and Koenig, P.C.

(57) ABSTRACT

Method for recognizing one or more properties of a geological formation by the injection of a fluid into at least one borehole within the formation. The injection fluid either has a different resistivity to the formation and/or formation fluids or has the capacity to change the resistivity of the formation and/or formation fluids. Resistivity mapping is undertaken to determine the distribution of the injected fluid and to therefore understand the permeability structure and fluid distribution of the formation. In addition the injected fluid or mixture of injected and formation fluids can be ignited. By making consecutive resistivity mapping of the formation at selected time intervals during injection, the flow path of injected fluid can be determined by using the collected time lapse resistivity data.

20 Claims, No Drawings

TRACING INJECTED FLUIDS

FIELD OF THE INVENTION

The present invention relates to the geophysical mapping of subsurface physical properties. More specifically the present invention relates to the injection of fluids with the aim of tracing their subsequent distribution and migration as a means to study the properties and fluid content of, and fluid movement within, a geological formation.

BACKGROUND OF THE INVENTION

The ability of a geological formation to allow the passage of fluids is dependent upon the size of the pores, their connectivity (permeability) and the properties of the fluid. The effective permeability also depends upon the relative saturations of the various fluids within the pores. Within hydrocarbon reservoirs, the permeability affects the flow path of both formation fluids and injected fluids within the reservoir. It is beneficial to know the reservoir permeabilities to optimize production strategies.

Various attempts have been made to trace fluid flow within the reservoir using tracers placed into injection wells and detected during production. U.S. Pat. No. 6,645,769 describes such a technology. The use of these methods is limited by the fact that tracers can only be detected in the production well and at least two wells must be drilled.

Other methods propose the use of acoustic properties of injection fluids in order to trace their spatial distribution through time (U.S. Pat. Nos. 4,479,204; 4,969,130; 5,586,082; 6,438,069). Such methods are limited by the fact that the acoustic properties are not always a reliable measure of the fluid composition.

The object of the present invention is to overcome the limitations of the above mentioned methods by injecting a fluid that can be sensed by resistivity mapping techniques. The electrical resistivity is a parameter which is highly dependent on the fluid type. Resistivity mapping has been used for hydrocarbon prospecting as described in U.S. Pat. Nos. 4,617,518; 4,633,182; 6,603,313; 5,770,945. Its use for reservoir monitoring purposes is described in U.S. Pat. No. 6,739,165.

SUMMARY OF THE INVENTION

The present invention relates to a method for recognizing one or more properties of a geological formation by the injection of a fluid into at least one borehole within the formation. The injection fluid either has a different resistivity to the formation and/or formation fluids or has the capacity to change the resistivity of the formation and/or formation fluids. Resistivity mapping/measurement is undertaken to determine the distribution of the injected fluid and to therefore understand the permeability structure of and fluid distribution within the formation. In addition the injected fluid or mixture of injected and formation fluids can be ignited. By making consecutive resistivity mapping of the formation at selected time intervals during injection, the flow path of injected fluid can be determined by using the collected time lapse resistivity data.

DETAILED DESCRIPTION OF THE INVENTION

The method is used to study the properties and/or geometrical extent of a geological formation and/or the fluids within it. The method involves the injection of fluids into at least one borehole. Such injected fluids will have a resistivity that contrasts with the geological formation and/or the formation fluids and/or will change the resistivity of the formation or the formation fluids. The changes that result from injection of fluid will be mapped using resistivity mapping/measurement techniques.

The techniques used to map the resistivity of the formation, formation fluids and/or injected fluids may be remote, direct or a combination of the two. They may be applied in either the frequency domain or time domain. Methods may include, but are not restricted to, performing resistivity mapping using controlled source electromagnetic, magnetotelluric, galvanic methods or any combination of these. The data can be collected by airborne survey, from land-based measurements and/or marine-based measurements. Data collection can also be undertaken within the subsurface using detectors placed within one or more boreholes. The source of the electromagnetic, electric or magnetic field may be airborne, land or marine-based or placed within the borehole. The borehole and/or well casing may also be used as a source, or part of a source. Similarly, the borehole and/or well casing may also be used as a receiver, or part of a receiver. Any combination of source and receiver location is potentially possible.

The tracer is an injection fluid with an electrical resistivity that contrasts with the formation and/or formation fluids. The injection fluid may also have the capacity to change the resistivity of the formation or formation fluids by biological, chemical or physical means. The resistivity of the injected fluid may be changed through time to enable the tracing of fluid movement with the formation.

The injected fluid distribution at a certain time or at time intervals is detected and mapped using remote and/or direct resistivity mapping techniques well known in geophysics.

The method can be used once at least one borehole has been drilled into the formation. The method may include making resistivity observations on the formation prior to injection, although this is not essential. In addition the injected fluid or mixture of injected and formation fluids can be ignited. By mapping resistivity once or at selected time intervals during and/or after injection, the flow path of the injected fluid and consequently the permeability structure and fluid content of the formation can be determined. The resistivity or other properties of the injection fluid may be varied with time.

Mapping of resistivity data involves processing, migration, modeling and/or inversion of the data. Time lapse data are processed by joint-inversion and/or joint-processing of the resistivity data collected at different time intervals.

Seismic, gravity, magnetic and other geophysical data may also be used in any combination with resistivity measurements to map the distribution of the injected fluid or its alteration effects.

It is well known that seismic surveys are poor at detecting fluid properties and distribution, whilst these properties are better detected by resistivity surveys. The tracing approach according to the present invention thus provides significant advantages over existing methods.

Applications of the invention include, but are not restricted to:

1) The monitoring of hydrocarbon distribution within a reservoir, prior to and during production.

2) The estimation of porosity and permeability structure of a reservoir or reservoir analogue.

3) The monitoring of injected hydrocarbons in gas storage projects.

4) The monitoring of injected waste material.

EXAMPLE

An example of a typical application of the invention would be in hydrocarbon production. In this case the injection fluid could be, but is not limited to, solutions of hydrochloric acid (HCl) and/or sodium-chloride (NaCl) in water which are highly conductive. The injection of such fluids into a reservoir will cause a high resistivity contrast with respect to surrounding formations and the hydrocarbons within the reservoir. Such resistivity contrasts can be identified by using suitable equipment such as a horizontal dipole antenna and associated receivers placed on the seafloor or according to any other relevant acquisition configuration in marine and non-marine environments. Similarly, the resistivity contrast can be identified by placing one or more dipole antennae and/or one or more receivers within wells. There is a number of different configurations, many of which are already commercially available, that have the potential to identify the resistivity contrasts and the idea is flexible to different set-ups. The purpose of injecting such fluids into the reservoir is typically, but not limited to enable enhanced recovery of oil and gas by identifying the distribution of hydrocarbons and pathways for injection fluids. There may be additional benefits such as increased recovery by improved secondary permeability and porosity.

The invention claimed is:

1. A method for monitoring one or more properties of a hydrocarbon reservoir with at least one borehole, the method comprises the steps of:
    injecting into the hydrocarbon reservoir via the at least one borehole a tracer fluid which has resistivity different from resistivity of formation and formation fluid(s) of the hydrocarbon reservoir or which is able to change the resistivity of the formation or formation fluid(s);
    measuring remotely in ocean, air or on land over the hydrocarbon reservoir an altered resistivity of the hydrocarbon reservoir caused by the injected tracer fluid using at least one measurement device that is located outside of the at least one borehole; and
    interpreting the measurements to identify property changes in the hydrocarbon reservoir as a function of time.

2. The method according to claim 1, wherein the method further comprises determining a geometrical extent of the injected tracer fluid and/or the formational fluid(s).

3. The method according to claim 2, wherein the determination of geometrical extent of the injected tracer fluid comprises joint processing of resistivity mapping data sets collected at different time intervals.

4. The method according to claim 2, wherein the determination of geometrical extent of the injected tracer fluid comprises joint inversion of resistivity mapping data sets collected at different time intervals.

5. The method according to claim 2, wherein seismic data are used during the process of determination of geometrical extent of the injected tracer fluid.

6. The method according to claim 2, wherein gravity data are used during the process of determination of geometrical extent of the injected tracer fluid.

7. The method according to claim 2, wherein magnetic data are used during the process of determination of geometrical extent of the injected tracer fluid.

8. The method according to claim 1, wherein the resistivity measuring is also performed in the at least one borehole.

9. The method according to claim 1, wherein any property of the injected fluid is varied with time.

10. The method according to claim 1, wherein the injected tracer fluid changes the resistivity of components of the formation or the formation fluids.

11. The method according to claim 1, wherein the injected tracer fluid and/or the formation fluid(s) or any mixture of the two fluids is ignited.

12. The method according to claim 1, wherein the resistivity measuring is performed by using controlled source electromagnetic methods in the air, on land, or at sea, wherein a controlled source electromagnetic measurement device is placed outside of the at least one borehole.

13. The method according to claim 1, wherein the resistivity measuring is performed by using magnetotelluric methods, wherein a magnetotelluric measurement device is located outside of the at least one borehole, on land, in the air or at sea.

14. The method according to claim 1, wherein the resistivity measuring is performed using galvanic methods, wherein a galvanic measurement device is located outside the at least one borehole, on land, in the air or at sea.

15. The method according to claim 1, wherein the interpreting is performed by using a frequency domain method.

16. The method according to claim 1, wherein the interpreting is performed by using a time domain method.

17. The method according to claim 1, wherein the injection fluid is a solution comprising hydrochloric acid (HCl) and/or sodium-chloride (NaCl).

18. A method for mapping resistivity of a hydrocarbon reservoir, the method comprising:
    injecting into the hydrocarbon reservoir a tracer fluid which has a resistivity different from a resistivity of the hydrocarbon reservoir;
    remotely sensing an altered resistivity of the hydrocarbon reservoir caused by the injected tracer fluid using at least one of a controlled source electromagnetic method, a magnetotelluric method, or a galvanic method using a measurement device that is located outside of the hydrocarbon reservoir; and
    interpreting the remotely sensed altered resistivity to identify a resistivity change of the hydrocarbon reservoir as a function of time.

19. A method for determining fluid flow within a hydrocarbon reservoir, the method comprising:
    injecting into the hydrocarbon reservoir a tracer fluid which has a resistivity different from a resistivity of the hydrocarbon reservoir;
    remotely sensing an altered resistivity of the hydrocarbon reservoir caused by the injected tracer fluid using at least one of a controlled source electromagnetic method, a magnetotelluric method, or a galvanic method, wherein the remote sensing of the altered resistivity is performed periodically during a time interval using a measurement device that is located outside of the hydrocarbon reservoir;
    determining a fluid flow characteristic of the hydrocarbon reservoir based on the remotely, periodically sensed altered resistivity of the hydrocarbon reservoir.

20. A method for monitoring an offshore hydrocarbon reservoir using controlled source electromagnetic (CSEM) survey techniques, the method comprising:
    injecting into the hydrocarbon reservoir a tracer fluid having a resistivity different from a resistivity of the hydrocarbon reservoir; and
    monitoring an altered resistivity of the hydrocarbon reservoir caused by the injected tracer fluid using controlled source electromagnetic (CSEM) survey techniques using a measurement device that is located outside of the hydrocarbon reservoir.

* * * * *